US011556471B2

(12) United States Patent
Dropps et al.

(10) Patent No.: US 11,556,471 B2
(45) Date of Patent: Jan. 17, 2023

(54) CACHE COHERENCY MANAGEMENT FOR MULTI-CATEGORY MEMORIES

(71) Applicant: HEWLETT PACKARD ENTERPRISE DEVELOPMENT LP, Houston, TX (US)

(72) Inventors: Frank R. Dropps, Annandale, MN (US); Michael S. Woodacre, Winchester (GB); Thomas McGee, Chippewa Falls, WI (US); Michael Malewicki, Chippewa Falls, WI (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 748 days.

(21) Appl. No.: 16/399,230

(22) Filed: Apr. 30, 2019

(65) Prior Publication Data
US 2020/0349076 A1 Nov. 5, 2020

(51) Int. Cl.
G06F 12/0817 (2016.01)

(52) U.S. Cl.
CPC .... G06F 12/0817 (2013.01); G06F 2212/608 (2013.01)

(58) Field of Classification Search
CPC ........... G06F 12/0817; G06F 2212/608; G06F 2212/1048; G06F 12/0813; G06F 2212/1016; G06F 2212/502; G06F 12/082; G06F 12/0837; G06F 12/0842
See application file for complete search history.

(56) References Cited

U.S. PATENT DOCUMENTS

| 6,631,447 | B1 * | 10/2003 | Morioka ............. G06F 12/0826 711/124 |
| 6,640,289 | B2 | 10/2003 | McCrory et al. |
| 7,484,043 | B2 | 1/2009 | Heller et al. |
| 9,690,706 | B2 | 6/2017 | Pal et al. |
| 2008/0109624 | A1 | 5/2008 | Gilbert et al. |

(Continued)

OTHER PUBLICATIONS

J. H. Keim, D. R. Johnson, W. Tuohy, S. S. Lumetta and S. J. Patel, "Cohesion: An Adaptive Hybrid Memory Model for Accelerators," in IEEE Micro, vol. 31, No. 1, pp. 42-55, Jan.-Feb. 2011, doi: 10.1109/MM.2011.8. (Year: 2011).*

(Continued)

Primary Examiner — Jason W Blust
(74) Attorney, Agent, or Firm — Hewlett Packard Enterprise Patent Department

(57) ABSTRACT

In exemplary aspects of cache coherency management, a first request is received and includes an address of a first memory block in a shared memory. The shared memory includes memory blocks of memory devices associated with respective processors. Each of the memory blocks are associated with one of a plurality of memory categories indicating a protocol for managing cache coherency for the respective memory block. A memory category associated with the first memory block is determined and a response to the first request is based on the memory category of the first memory block. The first memory block and a second memory block are included in one of the same memory devices, and the memory category of the first memory block is different than the memory category of the second memory block.

20 Claims, 5 Drawing Sheets

(56) References Cited

U.S. PATENT DOCUMENTS

2019/0171573 A1* 6/2019 Rose .................. G06F 12/0831

OTHER PUBLICATIONS

Donald Yeung, "Multigrain Shared Memory," 1998, pp. 1-210, Massachusetts Institute of Technology.
Thomas J. Ashby et al., "Software-based Cache Coherence with Hardware-Assisted Selective Self-Invalidations Using Bloom Filters," IEEE Transactions on Computers, Apr. 2011, pp. 472-483, vol. 60, No. 4, IEEE Computer Society.

* cited by examiner

CACHE COHERENCY MANAGEMENT FOR MULTI-CATEGORY MEMORIES

BACKGROUND

In a multiprocessor shared memory system, data stored in a system memory local to a processor can be shared, resulting in copies of that data also being stored in caches of other processors. Cache coherency is employed to ensure that changes to the shared data or to copies of that data are propagated throughout the system, such that all copies reflect the same value. Hardware and/or software implementations supervise or manage cache coherency in the multiprocessor shared memory system by applying cache coherency protocols such as snoopy- or directory-based protocols. Directory-based cache coherency protocols employ coherency directories to track and store the state and ownership of memory blocks that may be shared with other processors in the multiprocessor shared memory system. Coherency directory caches can be employed to provide faster access to state and ownership information stored in coherency directories.

BRIEF DESCRIPTION OF THE DRAWINGS

Certain examples are described in the following detailed description and in reference to the drawings, in which.

DETAILED DESCRIPTION

Figure 1:
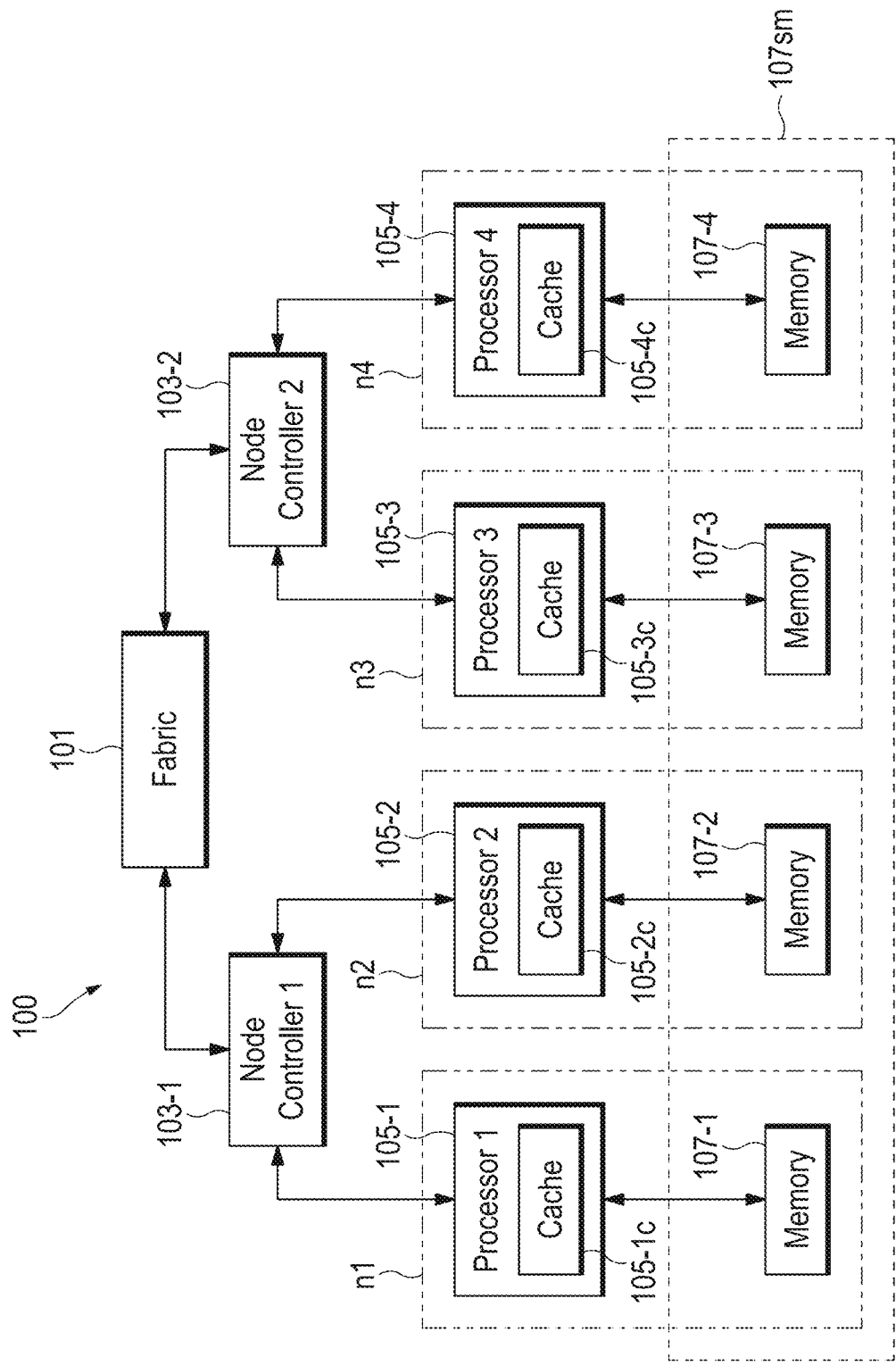
FIG. 1 is a diagram illustrating an exemplary embodiment of a cache coherent, shared memory system.

In the foregoing description, numerous details are set forth to provide an understanding of the subject disclosed herein. However, implementations may be practiced without some or all of these details. Other implementations may include modifications and variations from the details discussed below. It is intended that the appended claims cover such modifications and variations.

The present disclosure provides for managing cache coherency in multiprocessor shared memory systems. Cache coherency can be managed using different protocols, schemes and/or configurations, each of which provides varying advantages and disadvantages. For instance, cache coherency can be managed by hardware and/or software. Moreover, cache coherency can be directory-based, meaning that the cache coherency protocol employs coherency directories (also referred to herein as "directories") to store information relating to memory blocks or copies of data from the memory blocks (e.g., cache lines). The information stored in directory entries can include the state and/or ownership of the memory blocks or cache lines. The state and ownership information stored in the directories can be used to facilitate or ensure that there is coherency across the multiprocessor shared memory system—e.g., that changes to shared data are propagated to sharing processors or computing nodes in the system.

Systems that provide cache coherency management using a single cache coherency protocol suffer from the shortcomings of that protocol. For instance, for some protocols, as the amount of shared memory grows, the size of the directories likewise increases in order to accommodate the tracking of state and ownership information for additional memory blocks or cache lines. Larger directories therefore require even more memory, which can result in a larger consumption of power, computing, and area resources. The information movement required to maintain the coherency protocol could consume resources that would otherwise be available for other system uses.

In example embodiments described herein, memory blocks or regions of memory such as the shared memory of the system can be categorized into one of three memory categories. However, it should be understood that the system can support more or fewer than three memory categories, each having a unique cache coherency protocol or management approach. Each of the memory categories indicates the cache coherency protocol to be used for the respective memory blocks or regions of that memory. By simultaneously supporting multiple memory categories, the system can implement an optimal or improved cache coherency management arrangement that maximizes or leverages advantages and minimizes or avoids disadvantages of the cache coherency protocols of the memory categories.

For instance, for a first memory category, cache coherency is managed by hardware. According to the cache coherency protocol of the first memory category, state and ownership information of local memory blocks and/or corresponding cache lines is stored in a coherency directory in the system memory. Moreover, a coherency directory cache is provided on a corresponding node controller to store copies of some or all of the state and ownership information stored in the coherency directory. The node controller, among other things, manages access to local memories. Therefore, when the node controller receives a request that requires access to state and ownership information, the node controller can efficiently obtain that information from its coherency directory cache without having to retrieve it from the coherency directory in the system memory.

Notably, because the coherency directory cache need not increase in size as the system memory and the corresponding coherency directory increase, the size of the node controller can remain constant (and/or not grow in the same proportion as the system memory). Such a configuration therefore makes the system scalable to very large system memory sizes. On the other hand, the cache coherency protocol of the first memory category requires the consumption of system memory to store the coherency directory. As the system memory grows, the coherency directory likewise increases in size to track the state and ownership of the growing system memory, thereby consuming more memory resources. Moreover, maintenance of the coherency directory cache can require accesses to the system memory to obtain the state and ownership information when the coherency directory cache has a miss or other cache management related activities.

For a second memory category, cache coherency is managed by hardware. According to the cache coherency protocol of the second memory category, state and ownership information of memory blocks and/or corresponding cache lines is tracked using a coherency directory stored in the node controller (e.g., a memory of the node controller). That is, instead of storing the coherency directory in the system memory of the computing node or corresponding to the processor, the directory is stored and managed by the node controller. When the node controller receives a request that requires access to state and ownership information relating to its local memories, the node controller can efficiently obtain that information from its coherency directory without having to retrieve it from a coherency directory stored in the system memory, thereby impacting system performance.

Storing a directory in the node controller does not require consuming additional system memory. Moreover, because the node controller need not access the system memory to retrieve state and ownership information to maintain its directory, system performance is not impacted as much by the cache coherency protocol of the second memory category. On the other hand, the cache coherency protocol of the second memory category creates obstacles to scalability. For instance, maintaining precise state and ownership information (e.g., for all memory blocks) for a very large system memory requires an increase in resources (e.g., memory, size) at the node controller.

For a third memory category, cache coherency is managed by software. That is, the cache coherency of memory blocks of the third memory category are handled by or in accordance with a software application. Such a protocol does not consume system memory, as a directory is not employed to track the state and ownership information. Moreover, because software managed coherency does not use a directory, there is no need for system memory accesses or hardware messages that are required to obtain or maintain the directory. By not requiring a coherency directory or a coherency directory cache in the node controller for these memory areas, its size and resources can also be reduced. On the other hand, however, software managed cache coherency does necessitate a more complex application programming model to implement, and can cause some application performance depending on the amount of data sharing that is required.

Multiprocessor Shared Memory System

FIG. 1 illustrates an exemplary embodiment of a cache coherent computing system 100. As shown in FIG. 1, the computing system 100 includes computing components (e.g., processors, memory) that, for purposes of illustration and simplicity, are arranged into computing nodes n1, n2, n3 and n4 (collectively referred to herein as "n1-n4" or "computing nodes"). That is, each of the computing nodes n1-n4 refers to an association or logical grouping of computing components that need not be housed separately or physically segregated from the computing components of other computing nodes. In some embodiments, multiple computing nodes (and memories, node controllers) can be housed together in a single chassis or package. Moreover, in some embodiments, reference to one of the computing nodes n1-n4 can indicate a reference to a processor or memory device of that computing node. The computing nodes n1-n4 are communicatively coupled to node controllers 103-1 (node controller 1) and 103-2 (node controller 2) (collectively referred to herein as "103" or "node controllers 103").

The node controllers 103 are communicatively coupled to one another via a fabric (or fabric interconnect) 101. As described in further detail below, the node controllers 103 are configured to provide certain management functions for and/or on behalf of corresponding computing nodes, as known to those of skill in the art, including cache coherency management and/or implementation of cache coherency protocols or other memory access protocols. Although the exemplary computing system 100 of FIG. 1 includes, for purposes of illustration, two node controllers and four computing nodes, the computing system 100 can include any number of node controllers and computing nodes.

The computing nodes n1-n4 are computing systems that include processors and memories (e.g., memory devices), as shown in the exemplary embodiment illustrated in FIG. 1. It should be understood that the computing nodes can include or be made up of any number of processors and/or memories, as well as other hardware and software not illustrated in exemplary FIG. 1, as known to those of skill in the art. The computing nodes n1-n4 (and/or their respective components) can be physically or virtually defined. Moreover, each the computing nodes n1-n4 (and/or their components) can be physically housed independently or together with others of the computing nodes. Accordingly, in some embodiments, the computing system 100 can be a server made up of one or more chassis, each chassis including one or more computing nodes.

In some embodiments, each of the computing nodes n1-n4 includes a processor and memory though, as mentioned above, can include various other hardware and/or software components. As shown in FIG. 1, the computing nodes n1, n2, n3 and n4 include processors 105-1 (processor 1), 105-2 (processor 2), 105-3 (processor 3) and 105-4 (processor 4) (collectively referred to herein as "105" or "processors 105"), and memories 107-1, 107-2, 107-3 and 107-4 (collectively referred to herein as "107" or "memories 107"), respectively. In some embodiments, the processors 105 (and/or memory controllers of the processors 105) are communicatively coupled (e.g., directly connected) to their respective memories 107 via one or more memory channels and/or buses such as a Peripheral Component Interconnect (PCI) bus, an Industry Standard Architecture (ISA) bus, a PCI Express (PCIe) bus, and high performance links, such as the Intel® direct media interface (DMI) system, QuickPath Interconnects, Hyper-Transport, Double Data Rate (DDR), SATA, SCSI, or Fibre Channel Bus, and the like. Although not illustrated in FIG. 1, in some embodiments, one or more of the memories 107 are connected to the fabric 101.

In some embodiments, memories can be local to a processor, and remote to other processors. For instance, in FIG. 1, each of the memories (e.g., memory 107-1) can be deemed or referred to as being "local" to one of the processors (e.g., processor 105-1) with which it is communicatively coupled (e.g., directly attached). Each of the memories that is not local to a processor can be deemed as or referred to as being "remote" to those processors. Likewise, the processors 105 and memories 107 (and/or nodes n1-n4) can be local or remote to one of the node controllers 103. For instance, as illustrated in FIG. 1, the node controller 103-1 is communicatively coupled to the processors 105-1 and 105-2 (and, thereby, their local memories 107-1 and 107-2). Therefore, the processors 105-1 and 105-2 (and their local memories 107-1 and 107-2) are local to the node controller 103-1, while the other processors and memories can be deemed to be remote to the node controller 103-1. It should be understood that the node controllers 103 can have any number of local processors and memories.

Each of the processors 105 are independent processing resources, nodes or units configured to execute instructions. It should be understood that each of the processors 105 can be or refer to one or more central processing units (CPUs), a dual-core or a multi-core processor made up of two or more CPUs, a computing cluster, a cloud server, or the like. In some embodiments, two or more of the processors 105

(e.g., processor 105-1 and processor 105-2) can be communicatively coupled using point-to-point interconnects or busses. For example, two or more of the processors 105 can be connected using Intel's Ultra Path Interconnect (UPI) or Intel's QuickPath Interconnect (QPI).

Each of the memories 107 can include or be made up of any number of memory devices, which can be volatile (e.g., Random Access Memory (RAM), Static RAM (RAM) (SRAM), Dynamic RAM (DRAM)) and/or non-volatile (e.g., Non-Volatile RAM (NVRAM), Double Data Rate 4 Synchronous Dynamic (RAM) DDR4 SDRAM) devices. Other types of memory devices that may be used include read only memory (ROM) (e.g., mask ROM, programmable ROM (PROM), erasable programmable ROM (EPROM), and electrically erasable programmable ROM (EEPROM)), flash memory, memristor devices, and the like.

As known to those of skill in the art, the memories 107 can be used to store software such as operating systems (OSs), hypervisors and other applications. The software stored on the memories 107 is made up of processes and/or threads that can be executed concurrently and share resources such as memory (e.g., memories 107) and processors (e.g., processors 105). The processes and/or thread, when executed, can cause requests and responses to be transmitted among the processors 105 (and/or the node controllers 103-1 and 103-2). As described in further detail below, the software stored in the memories 107 can be used to provide cache coherency.

The memories 107 or portions (e.g., memory blocks, segments) thereof can form a shared memory 107*sm*. The shared memory 107*sm* formed from all or portions of all or some of the memories 107 can be shared and/or accessed by all or some of the processors 105. That is, for example, data stored in a portion of the memory 107-1 that is shared and thus a part of the shared memory 107*sm* can be accessed by processors other than processor 105-1. It should be understood that permissions (e.g., read/write permissions) can be used to control access to all or portions of the shared memory 107*sm* and/or by all or some of the processors 105. It should be understood that, for simplicity, unless indicated otherwise, reference herein to the any or all of the memories 107 shall refer to the portions that are shared and that make up the shared memory 107*sm*, although the memories 107 can, in some embodiments, include non-shared regions.

As known to those of skill in the art, each of the memories 107 and/or portions thereof can be configured or programmed in accordance with various settings as known to those of skill in the art. Such configurations can include designating the memories 107 and/or portions thereof as shared memory. Such configurations can take place, for instance, when partitioning the memories 107. While a number of other settings known to those of skill in the art can be defined or set for memory blocks or memory regions of the memories, one example is a cache coherency protocol. The cache coherency protocol defines the manner in which cache coherency is to be managed or handled for a corresponding block or region of memory. For purposes of illustration, the memory categories will be described with reference to memory blocks. However, it should be understood that memory categories can be assigned to regions and/or other portions of memory of any size.

As described in further detail below (e.g., with reference to FIG. 2), memory blocks can be categorized using a memory category that indicates their cache coherency protocol and/or cache coherency management scheme. While the memory blocks can be assigned a memory category from a set of any number of memory categories and corresponding cache coherency protocols, in some example embodiments described herein, the memory blocks can be assigned any of up to three memory categories that define their cache coherency protocol or management scheme:

Category 1: Hardware managed coherency with coherency directory cache on a node controller;

Category 2: Hardware managed coherency with a coherency directory on a node controller; and Category 3: Software managed coherency The dynamic configurability of memory segments into one of the cache coherency categories creates a hybrid shared memory and multiprocessor system that makes it possible to leverage the advantages (and minimize the disadvantages) of each cache coherency category. It should be understood that each of the memories 107 can be of different sizes and define any number of memory blocks or regions therein that can be of any size and/or configuration. As described in further detail below, at least some information about the definition or configuration of the memory blocks or memory regions can be stored, for instance, in respective node controllers. In some embodiments, node controllers can store information indicating the memory category and/or cache coherency protocol of memory blocks (and/or memory regions). That information allows the node controller to readily identify the cache coherency protocol for each memory category of memory blocks, and take specific action based on that protocol. In some embodiments, the memory category or cache coherency protocol for memory blocks (or memory regions) can be stored and/or tracked using base-limit registers. That is, for example, the node controller can store base-limit registers, each of which corresponds to a memory category. Each base-limit pair, which is associated with a memory category, can include or identify memory addresses and/or ranges of memory covered by that memory category. Accordingly, the node controller can determine which base-limit pair a received memory address falls within, and thereby identify the memory category of the base-limit pair and thus of the memory block at that memory address. The base-limit pair can also identify the node controller fabric locations of the memory regions.

Still with reference to FIG. 1, each of the processors 105 can include or be associated with one or more processor caches for storing data from the memories 107, to provide faster access to that data. More specifically, caches 105-1*c*, 105-2*c*, 105-3*c*, and 105-4*c* (collectively referred to herein as "105*c*" or "caches 105*c*") are associated with (and/or are local to) the processors 105-1, 105-2, 105-3 and 105-4, respectively. It can also be said that, in some embodiments, each of the memories 107 is associated with the cache 105*c* of its corresponding processor 105. It should be understood that a single cache can correspond to a single processor or can be shared among multiple processors. It should also be understood that each cache can be physically disposed on the same or a separate chip or component as its corresponding processor.

Because data from or stored in the memories 107 can be accessed more quickly when it is cached, the caches 105*c* can be used to store copies of data originally stored in the memories 107 that, for example, are accessed more frequently and/or may need to be accessed with more efficiency. It should be understood that the cached data can include all or a subset of the data stored in the memories 107. When caching, data is transferred from the memories 107 to the caches 105*c* in blocks of fixed size referred to as cache lines or cache blocks. Copied cache lines are stored in the caches 105*c* as cache entries. A cache entry contains several types of information, including the corresponding data copied from the memories 107 as well as the memory location (e.g., tag or address) of that data within the memories 107.

In some embodiments, it is possible for multiple copies of shared data to be stored in multiple caches 105c. For example, data stored in the memory 107-1 associated with processor 105-1 can be cached its local cache 105-1c, and shared with other processors such that copies thereof are also stored or cached in remote caches 105-2c, 105-3c and/or 105-4c. In such cases, access to that shared data is coordinated to provide coherency. For instance, when the shared data is modified, those changes are propagated throughout the system 100 to ensure that all of the copies of that data are updated and coherent or the shared copies are invalidated to ensure coherency is maintained.

Directories can be used to track shared data and provide coherency. As described in further detail below (e.g., with reference to FIG. 2), directories can track and/or store information about shared data, including, for example, state and ownership information. Moreover, as also described in further detail below, directories can be stored in one or more components or devices based on the type of memory category. While directories can be "full directories" that include information (e.g., state, ownership) about all shared data in the memories 107, unless indicated otherwise, directories herein are used to track all or portions of the cache lines or blocks of corresponding system memory.

Still with reference to FIG. 1, as discussed above, the node controllers 103 are computing devices or components configured to provide and/or execute various functions on behalf of or for respective computing resources, including computing nodes, memories and/or processors (e.g., cache coherency, routing, load balancing, fault resilience and the like). In some embodiments, the functionality of each of the node controllers 103 can be provided instead in one of the processors 105 of the multiprocessor system 100.

In some embodiments, the node controllers 103-1 can be or include a general purpose processor (e.g., microprocessor, conventional processor, controller, microcontroller, state machine, sequencer), a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. In some embodiments, cache coherency management (e.g., FIG. 4) is performed by a node controller including a coherency manager hardware sequencer, hardware state machine and/or other circuits or hardware components. Though, it should be understood that the coherency management can also be provided through processor implemented instructions, as known to those of skill in the art. The node controllers 103-1 can also include one or more memories or memory devices, such as ROM, RAM, DRAM, EEPROM, flash memory, registers or any other form of storage medium known to those of skill in the art.

As illustrated in exemplary FIG. 1, the node controller 103-1 is communicatively coupled to and/or associated with the nodes n1 and n2 (and/or their processors 105-1 and 105-2); and the node controller 103-2 is communicatively coupled to and/or associated with the nodes n3 and n4 (and/or their processors 105-3 and 105-4). It should be understood that each of the node controllers 103 can be communicatively coupled to and/or associated with any number of nodes and/or processors. In some embodiments, the node controllers 103 and their respective, local processors are communicatively coupled via interconnects such as UPI links. Moreover, the node controllers 103 can be interconnected with one another via the fabric 101.

In some embodiments, the node controllers 103 can provide cache coherency by tracking, among other things, state and ownership information of cache lines in corresponding caches among the caches 105c. As described in further detail below, the node controllers 103 can employ directories and/or directory caches to provide cache coherency. That is, although not illustrated in FIG. 1, in some embodiments, the node controllers 103 can include a coherency directory cache corresponding to a directory for tracking, for example, the state and ownership information of cache line sized blocks of system memory. It should be understood, however, that as described herein, directories can additionally or alternatively be stored in memory not in the node controller (e.g., in one of the memories 107).

The fabric 101, through which the node controllers 103 (and, thereby, the processors 105) can communicate with one another, can include one or more direct and/or switched interconnects. For example, in some embodiments, the fabric 101 can include direct interconnections between the node controllers 103-1 and 103-2 (e.g., to minimize latency). Accordingly, the fabric 101 can be used to transmit data and/or messages between or among one or more of the node controllers 103 and/or processors 105. Such communications can include, for example, requests to read or write memory or cache blocks, in which case the node controllers 103 can provide or facilitate cache coherency via multiple, simultaneously-implemented, cache coherency protocols for each type of memory category, as follows.

Figure 2:
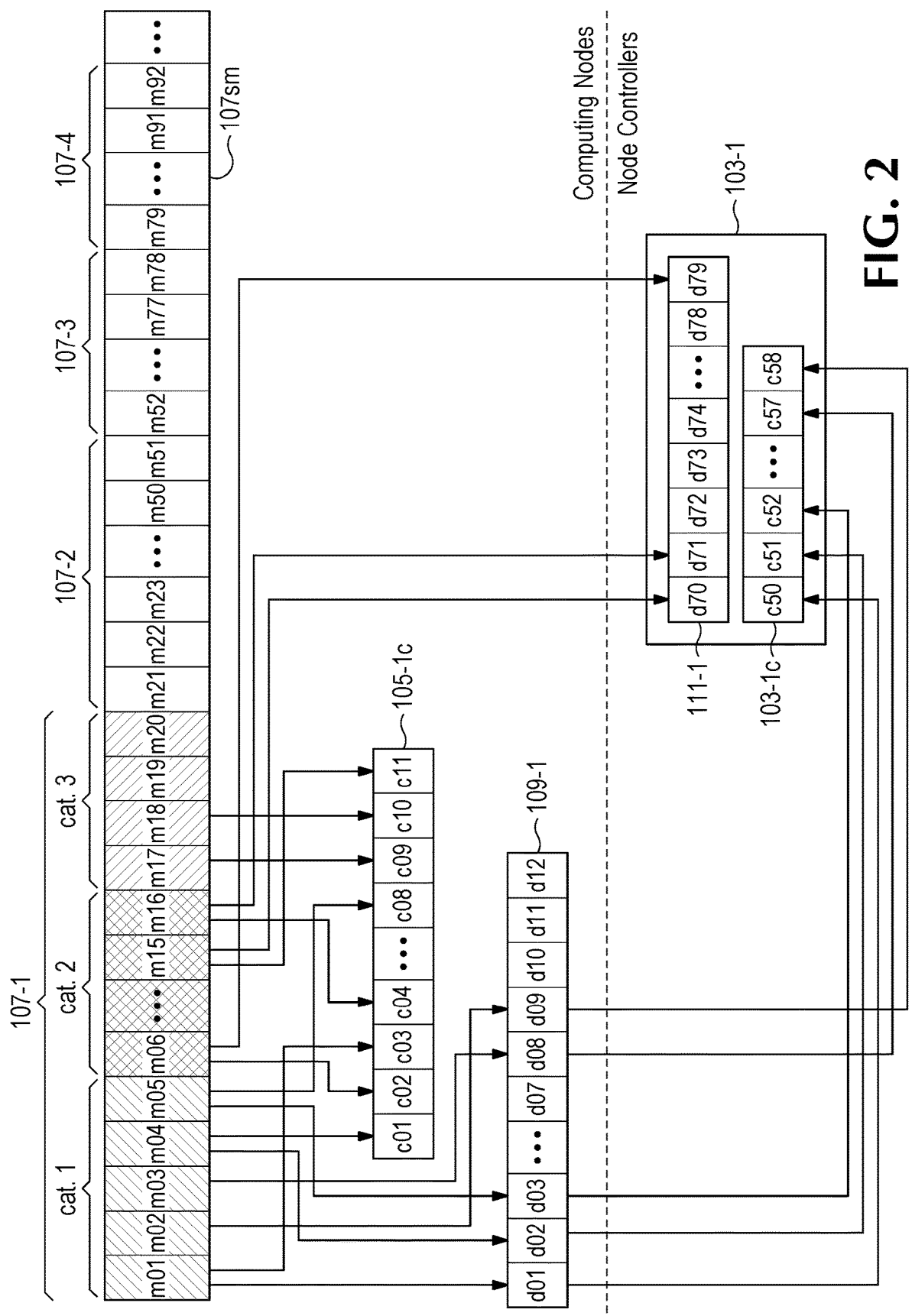
FIG. 2 is a diagram illustrating an exemplary embodiment of portions of the shared memory system of FIG. 1 including multiple memory categories.

FIG. 2 illustrates an exemplary embodiment of a shared memory having memory blocks of multiple categories of memory, each of the categories having or indicating a different cache coherency protocol for managing cache coherency thereof. More specifically, in FIG. 2, the shared memory 107sm is shown, which is made up of the memories 107-1, 107-2, 107-3 and 107-4, corresponding and/or local to the processors 105-1 to 105-4 and/or the computing nodes n1 to n4, respectively. For purposes of illustration, as shown, the portion of the shared memory 107sm that is made up of the memory 107-1 includes memory blocks numbered m01 to m20, each of which can be of any size and/or of different sizes from the others. Likewise, the portion of the shared memory 107sm that is made up of the memory 107-2 includes memory blocks numbered m21 to m51; the portion of the shared memory 107sm that is made up of the memory 107-3 includes memory blocks numbered m52 to m79; and the portion of the shared memory 107sm that is made up of memory 107-4 includes memory blocks numbered m79 to m92. The memory blocks are configured to store data. It should be understood that the shared memory 107sm can be of any size, include any number of memory blocks or regions, and be made up of any number of memories or memory devices corresponding to any number of computing nodes. Moreover, the memories 107-1, 107-2, 107-3 and 107-4 (and blocks, categories or regions within each of those memories) need not be contiguous, despite being illustrated as such in exemplary FIG. 2.

For simplicity, memory categories and their corresponding cache coherency protocol (e.g., cache coherency management scheme, protocol, configuration) for managing cache coherency are now described in more detail with reference to the memory 107-1 of the shared memory 107sm. It should be understood that, although not illustrated in or discussed with reference to FIG. 2 for purposes of simplicity, the memories 107-2, 107-3 and 107-4 can include some or all of the features, arrangements, configurations and/or functionality that are described below with reference to the memory 107-1. Accordingly, it should be understood that, similar to the memory 107-1, the memories 107-2, 107-3 and 107-4 can include memory blocks of multiple memory categories, and likewise be associated with caches, directories, and/or node controllers.

Still with reference to FIG. 2, the memory 107-1 includes memory blocks of three different memory categories: blocks m01 to m05 are of memory category (labeled "cat. 1") memory blocks; memory blocks m06 to m16 are of memory category 2 (labeled "cat. 2"); and memory blocks m17 to m20 are of memory category 3 (labeled "cat. 3"). Memory blocks of different categories have different cache coherency management protocols associated therewith. As described above, the memory category of a memory block or memory region can be set, for example, during a memory management operations operation or partitioning of the memory. It should be understood that a memory can include memory blocks of any number of memory categories. That is, although the exemplary memory 107-1 includes three different categories of memory, the memory 107-1 can include memory blocks of one or multiple different categories. Moreover, the memory blocks of a memory that are of a single category need not be contiguous. That is, for example, although the category 1 memory blocks (m01 to m05) of the memory 107-1 illustrated in FIG. 2 are shown as being contiguous, those same memory blocks could be non-contiguously distributed at other regions or addresses of the memory 107-1.

In some embodiments, the memories 107-1 to 107-4 are associated with caches 105-1c to 105-4c, respectively. In some embodiments, data stored in memory blocks can be cached (e.g., in a processor cache), meaning a copy of the data (referred to as a "cache line" or "cache block") is stored in cache entries of the cache. An exemplary structure of a cache entry storing a cache line (e.g., copy of data) is shown in Table 1 below:

TABLE 1

| Cache Index | Valids | Tag | Data |
|---|---|---|---|

As shown in Table 1, among other information, the cache entry can include an index, a valid bit, a tag and a copy of the data copied from one of the main memories—the cache line. In some embodiments, the cache index can be an identifier associated with each cache entry or cache block within the cache; valids can be an identifier (e.g., bits) indicating whether the corresponding cache entry is used or unused; the tag can be an identifier or descriptor for determining the identity of the cache line and/or for linking or associating the cache line to its corresponding memory block in the main memory; and the data refers to a copy of the data from a main memory (the cache line).

For purposes of illustration only, the cache 105-1c will now be described in further detail. It should be understood, however, that the caches 105-2c to 105-4c include some or all of the features of the cache 105-1c described herein. In some embodiments, copies of data stored in the memory blocks of the memory 107-1 can be cached in cache entries of a corresponding cache 105-1c of the processor 105-1, as well as in caches 105-2c, 105-3c and/or 105-4c. Although caches can be of any size, in some embodiments, the cache 105-1c of FIG. 2 is smaller than its respective memory 107-1. That is, the cache 105-1c is used to store a subset of the data stored in the memory 107-1, such as data that is more frequently used, where it can be more quickly accessed by the processor 105-1.

In exemplary FIG. 2, the cache 105-1c includes exemplary cache entries c01 to c11, which can be of any size. As illustrated by the arrows pointing from the memory blocks of memory 107-1 to the cache entries of the cache 105-1c, the cache entries c03, c01 and c08 are associated with and/or store copies of the data stored in memory blocks m01, m04 and m05, respectively, which are category 1 memory blocks. Cache entries c02, c11, c04 are associated with and/or store copies of the data stored in memory blocks m06, m15, m16, respectively, which are category 2 memory blocks. Cache entries c09 and c10 are associated with and/or store copies of the data stored in memory blocks m17 and m18, respectively, which are category 3 memory blocks. It should be understood that some of the cache entries (e.g., c05-c07) of the cache 105-1c can be unused at any given time.

As described above, in some embodiments, directories (or "coherency directories") can be used to track the status of memory blocks and/or corresponding cache lines throughout an entire system (e.g., system 100), including cache lines in remote caches. That is, a directory can store, in directory entries, information that indicates which caches have or are storing copies of data from a memory block in a local memory. Table 2 below illustrates the exemplary structure of a directory entry:

TABLE 2

| Tag | State | Ownership |
|---|---|---|

As shown in Table 2, each directory entry can include, for example, a tag, state information and ownership information. The tag can be the identifier, pointer or the like that associates the directory entry with a memory block (or cache entry). That is, the tag in a directory entry indicates which memory block or cache entry) the state and ownership information of that directory entry correspond to. The state information indicates the state of the memory block. It should be understood that different states can be tracked, including, for example, a modified state, an exclusive state, a shared state and/or invalid state.

As known to those of skill in the art, the modified state indicates that data from a memory block is cached only in one cache, but it is dirty—meaning that it has been modified from the original value stored in the main memory. The exclusive state indicates that data from a memory block is only cached in one cache, but it is clean—meaning that it matches the original value stored in the main memory. In some embodiments, the exclusive state enables data to be changed or updated without the need to notify other potential sharers of the block. The shared state indicates that the data from a memory block may be cached in other caches and it is clean—meaning that it matches the original value stored in the main memory. The invalid state indicates that data from a memory block is not cached.

Still with reference to Table 2, the ownership information indicates the processor that owns (e.g., has cached therein) a memory block or cache line—e.g., when the state of that memory block in the directory is a modified or exclusive state—or the processors that share a memory block—e.g., when in a shared state. It should be understood that the actual information stored as state and ownership information may vary, depending on the coherency implementation and protocol that is used.

The state and ownership of a memory and/or cache of a single computing node can be tracked using a single directory or multiple directories, which can be stored on one or more memories. In some embodiments, the storage location of directories can be based on the cache coherency category of the memory blocks in the corresponding cache. Moreover, in some embodiments, the number of directories associated with a cache of a single computing node can be based on the number of cache coherency categories of the memory blocks in the corresponding cache.

For example, as shown in FIG. 2 as discussed above, the memory blocks of the memory 107-1 are of three different categories (e.g., category 1, category 2 and category 3). These categories of memory are now described in further detail with reference to 3A and 3B.

Figure 3:
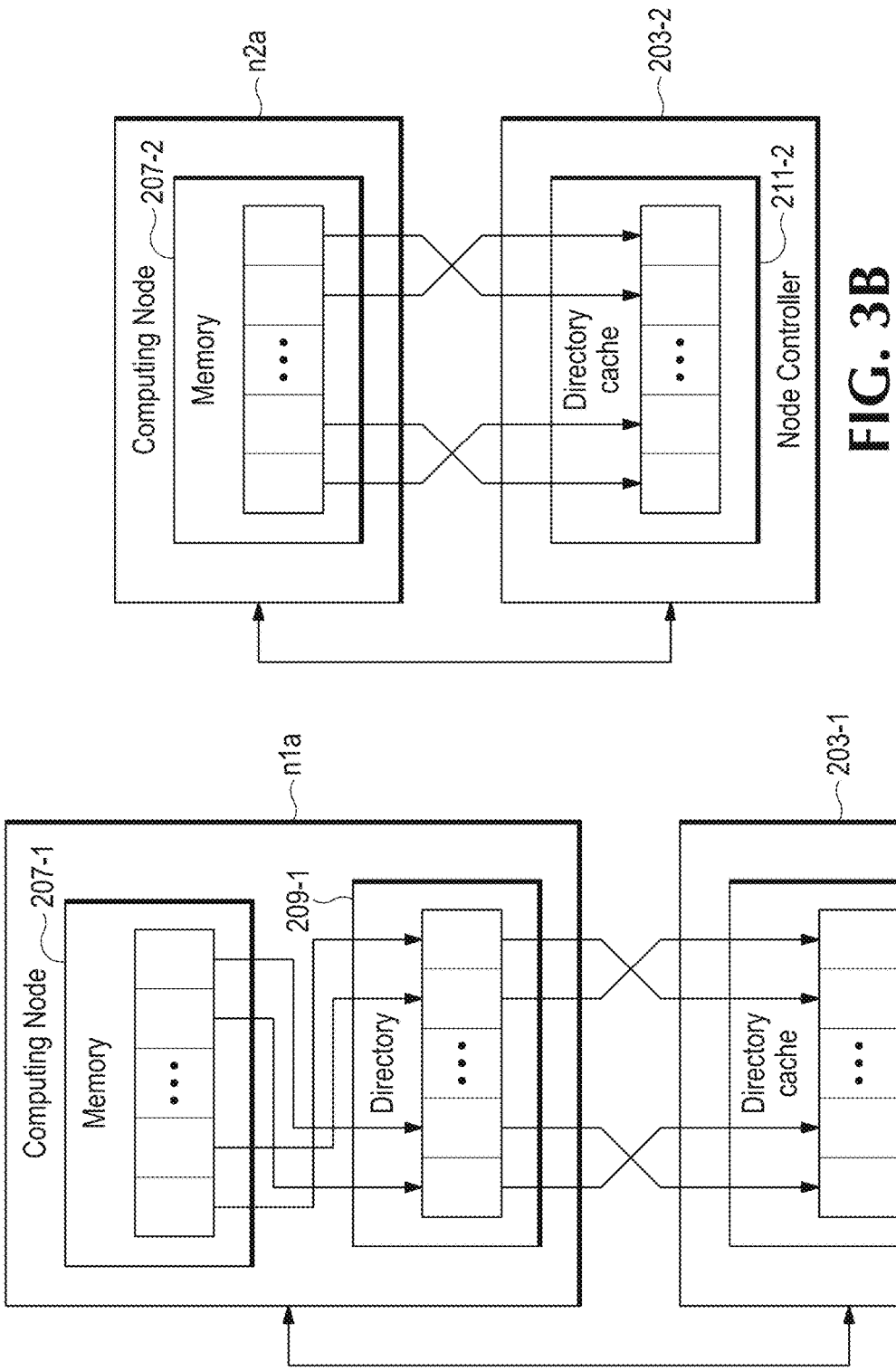
FIG. 3A is a diagram illustrating an exemplary embodiment of a computing node and a node controller for managing cache coherency of one memory category.
FIG. 3B is a diagram illustrating an exemplary embodiment of a computing node and a node controller for managing cache coherency of another memory category.

The cache coherency of memory blocks of category 1 is hardware managed using a coherency directory stored on the local main memory and a coherency directory cache stored on a corresponding node controller, as shown in exemplary FIG. 3A. The cache coherency of memory blocks of category 2 is hardware managed using a coherency directory stored on a corresponding node controller, as shown in exemplary FIG. 3B. The cache coherency of memory blocks of category 3 is software managed.

More specifically, in FIG. 3A, data is stored in category 1 memory blocks of the memory 207-1. The directory 209-1 of the computing node n1a manages coherency by tracking and/or storing, among other things, the state and ownership of all of or some of the memory blocks of the memory 207-1. The computing node n1a is communicatively coupled and/or associated with the node controller 203-1, through which the computing node n1a can communicate with other computing nodes. The node controller 203-1 includes a directory cache 203-1c that caches all or some of the directory entries of the directory 209-1. The exemplary arrangement of FIG. 3A provides scalability by allowing for the size of the memory and/or cache of the node controller 203-1 to remain relatively constant even as the size of the memory of the computing node n1a increases.

In FIG. 3B, data is stored in category 2 memory blocks of the memory 207-2c. The computing node n2a is communicatively coupled and/or associated with the node controller 203-2, through which the computing node n2a can communicate with other computing nodes. The node controller 203-2 includes a directory 211-2 that manages coherency by tracking and/or storing, among other things, the state and ownership of all or some of the memory blocks of the memory 207-2c. The exemplary arrangement of FIG. 3B does not require an increase or additional consumption of the memory 207-2 in order to track state and ownership information, and eliminates or reduces accesses to the memory 207-2 due to the directory on the node controller 203-2 storing, among other things, the state and ownership information.

It should be understood that the directories and other arrangements of the computing nodes n1a and n2a can be combined, such that a single computing node has a memory with memory blocks of multiple categories. As a result of such a combination, it is possible to provide directories stored in both the computing node and the corresponding node controller, and a directory cache can also be provided on the node controller. Moreover, although the directory 209-1 on the computing node n1a is illustrated as being separate from its corresponding memory 207-1, it should be understood that directories can be included and/or stored in the memory 207-1 (e.g., in non-shared portions of the memories 207-1). It should be noted that the directory cache 211-2 may function as both a directory and directory cache to track among other things the state and ownership of different memory categories. That is, it should be understood that in some embodiments herein, the distinction between a directory and a directory cache relates to the entry replacement algorithm and the completeness of the tracking of each. For instance, a directory could be configured to maintain tracking for all relevant memory blocks and not remove any entries with active remote ownership. Typically when the directory is located on the node controller, the node controller maintains the only copy of that information (e.g., state, ownership). A directory cache could be configured to contain a subset of the directory entries, and a full complete set of the directory information would also be maintained in another memory. A directory cache would normally replace older entries with newer ones.

Returning to FIG. 2, the memory 107-1 includes memory blocks of different categories. As a result, the cache coherency of the data of the memory blocks of the memory 107-1 employs a coherency directory 109-1 stored in the memory of the computing node n1, and another coherency directory 111-1 stored on the node controller 103-1. Moreover, in accordance with the coherency management protocol for the category 1 memory blocks, the node controller 103-1 includes a coherency directory cache 103-1c that includes copies of the entries in the directory 109-1. It should be understood that, in some embodiments, the directories 109-1 and 111-1, alone or in combination, can be configured to be smaller than or include fewer entries than would be needed to track the state and ownership information of all of the memory blocks of the memory 107-1. That is, the directories 109-1 and 111-1, alone or in combination, can track the state and ownership of only a subset of the memory blocks.

The directory 109-1 includes exemplary directory entries d01 to d12. As shown, the directory entries d01, d02, d03, d08 and d09 are associated with and/or store, among other things, state and ownership information for the memory blocks m01, m04 and m05, m03 and m02, respectively. Notably, the memory blocks m01, m04 and m05, m03 and m02 are category 1 memory blocks. As such, in accordance with the respective cache coherency management protocol of the category 1 memory blocks, the coherency directory cache 103-1c of the node controller 103-1 stores copies of all or some of the data (e.g., state, ownership) in the directory entries d01, d02, d03, d08 and d09. As discussed in further detail herein, the node controller 103-1 can readily access, in its own cache (103-1c), the ownership and state information for the memory blocks m01, m04 and m05, m03 and m02, without the need to access the directory 109-1, cache 105-1c and/or memory 107-1 on the computing node n1 to obtain that information. Specifically, the directory cache entries c50, c51, c52, c57 and c58 of the coherency directory cache 103-1c include copies of the directory entries d01, d02, d03, d08 and d09 of the directory 109-1, respectively.

Moreover, the directory 111-1 stored on the node controller 103-1 includes exemplary directory entries d70 to d79. As shown, the directory entries d70, d71 and d79 are associated with and/or store, among other things, state and ownership information for the data stored in the memory blocks m15, m16 and m06, respectively. Notably, the memory blocks m15, m16 and m06 are category 2 memory blocks. The node controller 103-1 can therefore access, in its own directory, the ownership and state information for the memory blocks m15, m16 and m06 without the need to access the memory 107-1 and/or the directory 109-1 on the computing node n1 to obtain that information.

It should be understood that the node controller 103-1 can include other directories and/or include additional directory entries in the directory 111-1 to additionally or alternatively track and/or store the state and ownership information for memory blocks in other associated memories such as the memory 107-2 of the node controller n2.

Figure 4:
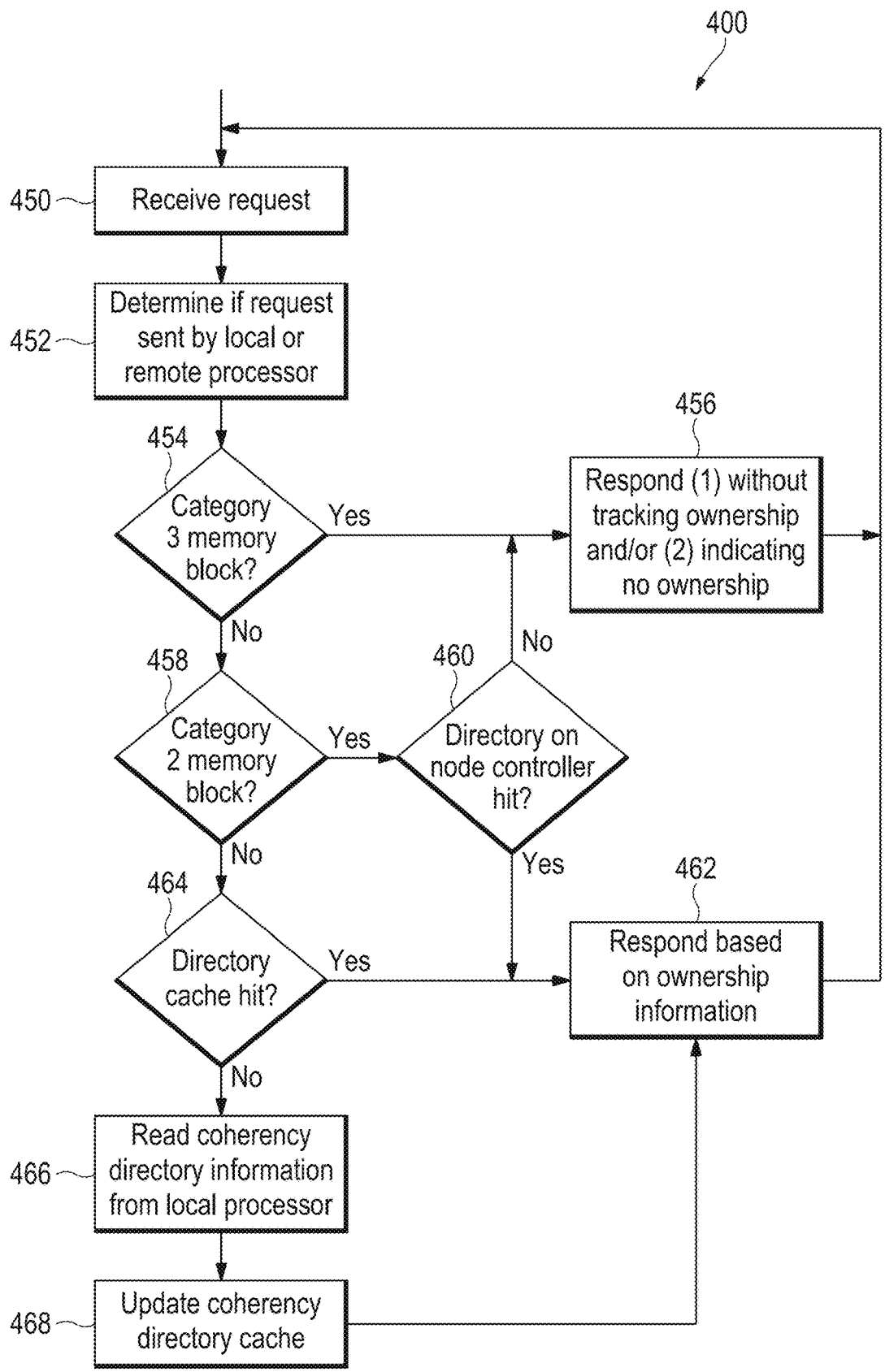
FIG. 4 is flow chart illustrating an exemplary embodiment of a process for managing cache coherency for the shared memory FIG. 1 including multiple memory categories.

FIG. 4 is a flow chart illustrating an exemplary embodiment of a process 400 for managing aspects of cache coherency for multi-category memories. More specifically, the process 400 details how the node controllers 103-1 in the system 100 (e.g., as described with reference to FIGS. 1 and 2) handles received requests that relate to memory blocks of and/or data stored in any of its associated memories 107-1 and 107-2 among the shared memory 107sm.

As discussed above, the node controller 103-1 is communicatively coupled to the computing nodes n1 and n2 (and/or their processors 105-1 and 105-2, respectively), which are local thereto. Moreover, the node controller 103-1 is coupled to other node controllers such as the node controller 103-2 via the fabric 101. The node controller 103-2 is communicatively coupled to the computing nodes n3 and n4 (and/or their processors 105-3 and 105-4), which are local thereto. The nodes n3 and n4 (and/or their processors 105-3 and 105-4) are remote to the node controller 103-1 (and/or to the computing nodes n3 and n4, and the processors 105-1 and 105-2). As shown in FIG. 2, the memory 107-1 includes memory blocks of multiple cache coherency categories (e.g., categories 1-3).

At step 450 of the process 400, the node controller 103-1 receives a request relating to a memory block in one of its corresponding memories, for example, triggered by a thread being executed by a processor. The request can include an instruction (e.g., read, write), an address for a memory block in or for which to process the instruction, data, and/or a source identifier (e.g., the requester processor). The request can be a remote request, meaning that it is received by the node controller 103-1 from one of the other node controllers (e.g., node controller 103-2) on behalf of their local processors (and/or from one of the processors themselves) of the system 100. On the other hand, the request can be a local request, meaning that it is received by one of the processors (e.g., 105-1 and 105-2) that are local to the node controller 103-1 receiving the request.

That is, in some embodiments, the request received by the node controller 103-1 can be originated or be sent from any of the processors 105, including local (e.g., processors 105-1 and 105-2) and remote (e.g., processors 105-3 and 105-4) processors. As known to those of skill in the art, the request can be routed to the node controller 103-1 based on information (e.g., a memory mapping) indicating that the memory block (or the memory address or addresses included in the request) is managed by the node controller 103-1. In some embodiments, the request received at step 450 can be a read or write command—e.g., to read or write a memory block in the memory 107-1. In some embodiments, the node controller 103-1, which is tasked with managing cache coherency, can obtain the state and ownership information of a memory block. As described above, the state and ownership information can be stored in various memories or memory devices, based on the memory category (e.g., categories 1-3 discussed above). The node controller 103-1 can use this information to accurately and efficiently respond to the request received at step 450.

In turn, at step 452, the node controller identifies whether the request received by the node controller 103-1 at step 450 originated from a local processor (e.g., processors 105-1 and 105-2) or a remote processor (e.g., processors 105-3 and 105-4). This determination can be performed by the node controller 103-1 based on data included in the request (e.g., an identifier of the requesting processor and/or node controller or where the request was received from) and/or information stored by the node controller 103-1. Based on this information (e.g., whether the request is from a local or remote processor), the node controller 103-1 can execute the appropriate cache coherency management at steps 454 to 468.

The node controller in turn determines whether the address (and/or addresses, address range) indicated in the request is a software-managed coherency (SMC) memory block (e.g., category 3). In some embodiments, this can be performed by determining whether the memory block is within an SMC memory region. That is, at step 454, the node controller 103-1 analyzes the address included in the request and checks the memory category associated with the memory block located at that address. As described above, the node controller 103-1 can make such a determination using memory management data or the like that includes information relating to the node controller's associated memories (e.g., 107-1, 107-2) among the shared memory 107sm. In some embodiments, this information can include the memory category (e.g., category 1-3) for blocks of the memories managed by or associated with the node controller 103-1.

If the node controller 103-1 determines at step 454 that the address referenced in the received request is a category 3 memory block and/or corresponds to a category 3 memory region (e.g., SMC), the node controller 103-1 transmits, at step 456, a response to the processor (e.g., via the processor's corresponding node controller) from which the request was received. It should be noted that, in embodiments in which the node controller 103-1 determines at step 452 that the request was originated by a local processor (e.g., processor 105-1, 105-2), the response transmitted at step 456 is sent to the local processor without being routed through another node controller. On the other hand, if the request was originated by a remote processor (e.g., processor 105-3, 105-4), the response transmitted at step 456 is sent to the remote processor through the remote processor's corresponding node controller (e.g., 103-2).

As known to those of skill in the art, the type of and/or information contained in responses can vary depending on a number of factors, including the cache coherency protocol, whether the request is a read or write instruction, among others. For instance, in some embodiments, the response can include one or more of data from the referenced memory block, and state and/or ownership information of the memory block.

In some embodiments, the type of response transmitted at step 456 (and/or at step 462 described in further detail below) can be based on the determination of step 452 as to whether the request was sent from a local or a remote processor. In some embodiments, if the request was received from a local processor, the node controller transmits a response at step 456 that includes an indication that no processor owns the memory block and/or has shared copies of the data stored in the memory block referenced in the request. This is due to the fact that software, rather than a processor, manages the cache coherency in software managed coherency approaches. That is, the software controls (e.g., tracks and ensures) the coherency of SMC memory blocks or regions. On the other hand, if the request was received by the node controller 103-1 from a remote processor, the response does not include ownership information of the memory block.

In turn, the node controller 103-1 returns to its original state where it awaits the receipt of additional requests at step 450.

Returning to step 454, if the node controller 103-1 determines that, on the other hand, the address referenced in the received request does not correspond to a category 3 or SMC memory block, the node controller in turn determines at step 458 whether the address corresponds to a category 2 memory block with cache coherency that is hardware managed using a directory on node controller (or on hub). This can be performed, in some embodiments, by checking whether that address is within a category 2 memory region. As in step 454, such a determination can be made based on information stored by the node controller 103-1 regarding the configuration of its corresponding or local memories (e.g., memories 107-1 and 107-2).

If the node controller 103-1 determines at step 458 that the address referenced in the request received at step 450 corresponds to a memory block with coherency that is hardware managed using a directory on hub (e.g., category 2 memory), the node controller in turn detects, at step 460, whether a directory hit occurs. As described above, in a hardware managed, directory on hub (or directory on node controller) configuration or implementation, the state and ownership information of category 2 memory can be included in the directory 111-1 stored in the node controller 103-1 (as opposed to being included in the computing node's main memory directory 109-1). It should be understood that the directory 111-1 can include, among other things, state and ownership information of all or a subset of the category 2 memory blocks.

As known to those of skill in the art, a directory hit and/or the occurrence thereof indicates that the directory 111-1 includes state and/or ownership information of the memory block corresponding to the address referenced in the request. On the other hand, if the directory 111-1 does not include state and ownership information of the memory block referenced in the request, a miss occurs (e.g., no hit occurs).

If a hit is identified at step 460, the node controller 103-1 in turn responds to the request at step 462. Because a hit has been identified, meaning that state and/or ownership information of the memory block are included in the directory 111-1, the response to the request can be based on and/or include the ownership of the memory block. As discussed above, the type of response can also vary based on whether the request was received from a local or remote processor, and/or whether the request was a read or write request. Notably, because the directory 111-1 stored in the node controller 103-1 includes the state and ownership information of the relevant memory block, the node controller 103-1 can efficiently respond to the request without needing to first access or retrieve state and ownership information stored elsewhere, such as in the main memory of a computing node.

If a hit is not identified at step 460 (and/or a miss is identified), meaning that the directory 111-1 does not include state or ownership information for the memory block, the node controller 103-1 in turn transmits, at step 456, a response to the requesting processor. As discussed above, the response transmitted at step 456 can vary depending on whether the request was received from a local or remote processor. In some embodiments, if the request was received from a local processor, the response can include an indication that the memory block is not owned by any processors (e.g., because it is owned by the software instead). On the other hand, if the request was received from a remote processor, state tracking information can be added to the directory 111-1 on the controller 103-1, and an appropriate response is sent to the requesting processor (e.g., via that processors node controller).

In turn, whether or not a hit is identified, the node controller 103-1, after sending a response at step 456 or 462, returns to step 450 where it can await additional requests to process.

Returning to step 458, if the node controller 103-1 determines that the memory block referenced in the request is not one with coherency that is hardware managed using a directory stored in a node controller (e.g., category 2 memory), the node controller in turn identifies, at step 464, whether a directory cache hit occurs. In other words, the node controller 103-1 checks whether its coherency directory cache 103-1c includes state and/or ownership information of the memory block referenced in the request.

It should be understood that the coherency directory cache hit check of step 464 is performed due to an assumption by the node controller 103-1c that the memory block referenced in the request is category 1 memory, namely memory with coherency that is hardware managed using the coherency directory 109-1 stored in the computing node's main memory (e.g., in the memory 107-1) and the directory cache 103-1c stored in the node controller 103-1. As described above, the directory cache 103-1c can store copies of data (e.g., state and ownership information) included in the corresponding directory 109-1. In some embodiments, the node controller 103-1 can make such an assumption that the memory block is category 1 memory because of its prior determinations that the memory block is neither category 3 nor category 2 type memory, and therefore must be category 1 memory. However, although not illustrated in FIG. 4, the node controller 103-1 can perform a check prior to step 464 to determine whether the memory block is category 1 memory, based on memory configuration information stored by the node controller 103-1.

If the node controller 103-1 determines at step 464 that a directory cache hit occurs (meaning that the address referenced in the request corresponds to a memory block with state and ownership information stored in the directory cache 103-1c), the node controller 103-1 transmits, at step 462, a response including state and ownership information to the requesting node controller or processor. Because, as indicated by the identified hit, the state and ownership information is stored in the cache directory 103-1c of the node controller 103-1, the node controller 103-1 can efficiently respond to the request without needing to access or retrieve state and ownership information stored elsewhere, such as in the main memory of a computing node. In turn, the node controller 103-1 returns to step 450 where it can await additional requests to process.

On the other hand, if the node controller 103-1 does not detect a hit (and/or detects a miss) at step 464, the node controller 103-1 reads and/or retrieves, at step 466, from the directory 109-1, directory information (e.g., state and ownership) of the memory block referenced in the request. As described above, the directory 109-1 is stored in memory other than in the node controller 103-1. For example, the directory 109-1 corresponding to the first computing node n1 and/or the processor 105-1 can be stored in the local memory 107-1 (e.g., in non-shared portions thereof).

In turn, at step 468, the node controller 103-1 updates its directory cache 103-1c to include the state and ownership information read or retrieved from the directory 109-1. That is, the node controller 103-1 can store a copy of the state and ownership information, as included in the corresponding directory 109-1, of the memory block referenced in the request received at step 450.

In turn, at step 462, the node controller 103-1 transmits a response to the requesting node controller or processor. The response can include state and ownership information of the memory block referenced in the request. The node controller 103-1 returns to step 450 where it can await additional requests to process.

It should be understood that, although the determinations (e.g., steps 454, 458) of the category of memory corresponding to a memory block are illustrated as sequential steps in the process 400, these determinations can be performed concurrently and/or partially concurrently. For example, in some embodiments, the node controller 103-1 can determine the category of memory of a memory block in a single step and, based thereon, process the request accordingly.

Figure 5:
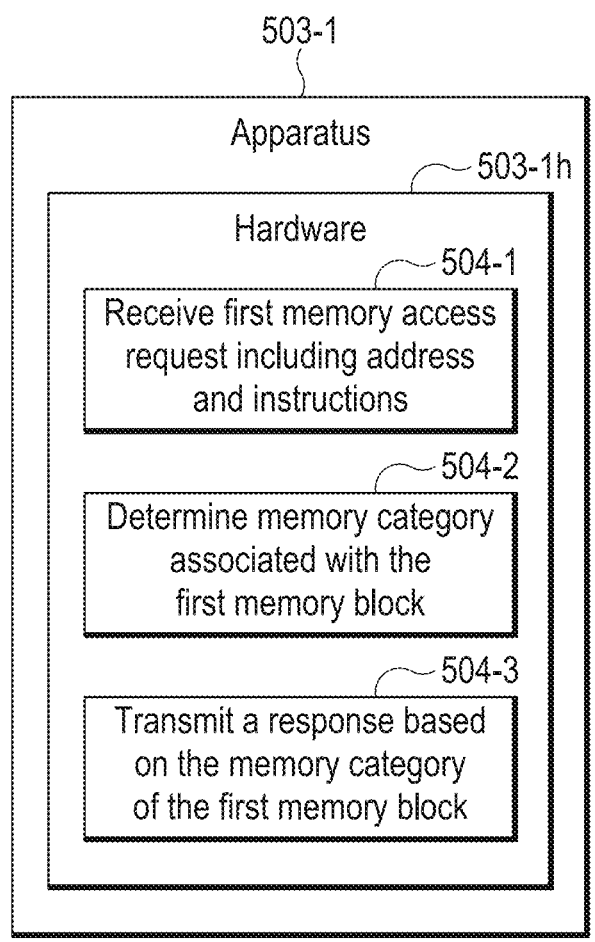
FIG. 5 is a diagram illustrating an exemplary embodiment of a node controller of the shared memory system of FIG. 1.

FIG. 5 illustrates an apparatus 503-1 for providing cache coherency management, including hardware or hardware components 503-1*h* (e.g., circuits, hardware logic). The hardware 503-1*h* is configured to perform or execute methods, functions and/or processes as described herein. In some embodiments, these methods, functions and/or processes can be embodied as machine readable instructions or code stored on a computer readable medium such as RAM, ROM, EPROM, EEPROM. These instructions can be executed by one or multiple processors of the apparatus 503-1.

As shown in FIG. 5, the hardware 503-1*h* can include hardware (and/or machine-readable and executable instructions) 504-1 for receiving a request such as a first memory access request including an address and instructions. The address can be the memory address of a first memory block in a shared memory, and the instructions can relate to the first memory block. The shared memory can include a plurality of memory blocks of one or more memory devices associated with respective processors. Each of the plurality of memory blocks can be associated with one of a plurality of memory categories indicating a protocol for managing cache coherency for the respective memory block.

The hardware 503-1*h* can include hardware (and/or machine-readable and executable instructions) 504-2 for determining a memory category associated with the first memory block, and hardware (and/or machine-readable and executable instructions) 504-3 for transmitting a response to the first memory access request based on the memory category of the first memory block.

The invention claimed is:

1. An apparatus comprising:
  a controller comprising a controller memory, the controller to:
    receive a first request including an address of a first memory block of a plurality of memory blocks in a shared memory accessible by a plurality of processors,
    wherein the shared memory includes a first memory connected to a first processor of the plurality of processors, the first memory and the first processor being part of a computing node, and
    wherein each respective memory block of the plurality of memory blocks is associated with a respective memory category of a plurality of memory categories, the plurality of memory categories comprising different cache coherency protocols for managing cache coherency for corresponding memory blocks;
    determine whether a memory category associated with the first memory block is a first memory category or a second memory category, wherein the first memory category comprises a first cache coherency protocol that uses a coherency directory comprising state and ownership information stored in the first memory of the computing node, and the second memory category comprises a second cache coherency protocol that uses a coherency directory stored in the controller memory of the controller but not in the first memory of the computing node; and
    in response to determining that the memory category associated with the first memory block is the second memory category, determine whether the coherency directory stored in the controller memory contains state and ownership information corresponding to the address included in the first request, and transmit a response to the first request based on the state and ownership information corresponding to the address included in the first request.

2. The apparatus of claim 1, wherein the controller is to:
  in response to determining that the memory category associated with the first memory block is the first memory category, determine whether the coherency directory stored in the first memory of the computing node contains state and ownership information corresponding to the address included in the first request, and transmit a response to the first request based on the state and ownership information corresponding to the address and contained in the coherency directory stored in the first memory of the computing node.

3. The apparatus of claim 1, wherein the plurality of memory categories further comprise includes:
  a third memory category comprising a software managed cache coherency protocol.

4. The apparatus of claim 1, wherein a second memory block of the plurality of memory blocks is associated with the first memory category.

5. The apparatus of claim 4, wherein, for the second memory block:
  the coherency directory in the first memory of the computing node contains state and ownership information for the second memory block, and
  the controller memory stores a coherency directory cache including a copy of the state and ownership information for the second memory block.

6. The apparatus of claim 1, wherein the response to the first request includes one or more of ownership information for the first memory block and data stored in the first memory block.

7. The apparatus of claim 6, wherein the ownership information in the response indicates which of the plurality of processors (i) owns the first memory block and/or (ii) may have copies of data in the first memory block stored in their respective caches.

8. The apparatus of claim 1, wherein the first request includes an identifier associated with a processor or a node controller from which the first request originated, and wherein the controller is to identify whether the first request is local or remote, the response to the first request being further based on whether the first request is local or remote.

9. The apparatus of claim 1, wherein the controller memory is to store memory category information for the plurality of memory blocks, and
  wherein the controller is to determine the memory category associated with the first memory block based on the memory category information.

10. The apparatus of claim 1, wherein the controller is to:
  transmit the response to the first request based on the state and ownership information corresponding to the address included in the first request, in response to determining that the coherency directory stored in the controller memory contains state and ownership information corresponding to the address included in the first request.

11. A method comprising:
receiving, at a node controller of a system comprising a plurality of processors in respective computing nodes, a first request including an address of a first memory block of a plurality of memory blocks in a shared memory accessible by the plurality of processors,
wherein the shared memory includes a first memory connected to a first processor of the plurality of processors, the first memory and the first processor being part of a first computing node, and
wherein each respective memory block of the plurality of memory blocks is associated with a respective memory category of a plurality of memory categories, the plurality of memory categories comprising different cache coherency protocols for managing cache coherency for corresponding memory blocks;
determining, by the node controller, whether a memory category associated with the first memory block is a first memory category or a second memory category, wherein the first memory category comprises a first cache coherency protocol that uses a coherency directory comprising state and ownership information stored in the first memory of the first computing node, and the second memory category comprises a second cache coherency protocol that uses a coherency directory stored in a controller memory of the node controller but not in the first memory of the first computing node; and
in response to determining that the memory category associated with the first memory block is the second memory category, determining, by the node controller, whether the coherency directory stored in the controller memory contains state and ownership information corresponding to the address included in the first request, and in response to determining that the coherency directory stored in the controller memory contains state and ownership information corresponding to the address, transmitting, from the node controller, a response to the first request based on the state and ownership information corresponding to the address.

12. The method of claim 11, comprising:
in response to determining that the memory category associated with the first memory block is the first memory category, determining, by the node controller, whether the coherency directory stored in the first memory of the first computing node contains state and ownership information corresponding to the address included in the first request, and transmitting, from the node controller, a response to the first request based on the state and ownership information corresponding to the address and contained in the coherency directory stored in the first memory of the first computing node.

13. The method of claim 11, wherein a second memory block of the plurality of memory blocks is associated with the first memory category, the method further comprising:
storing, in the coherency directory stored in the first memory of the first computing node, state and ownership information for the second memory block; and
storing, in a coherency directory cache in the controller memory, a copy of the state and ownership information for the second memory block.

14. The method of claim 11, comprising:
in response to determining that the coherency directory stored in the controller memory does not contain the state and ownership information corresponding to the address, transmitting, from the node controller, a response to the first request that indicates that the first memory block is not owned by any processor.

15. The method of claim 11, wherein the response to the first request includes one or more of ownership information for the first memory block and data stored in the first memory block.

16. The method of claim 11, further comprising:
storing, in the controller memory, memory category information for the plurality of memory blocks, and
wherein the determining of the memory category associated with the first memory block is based on the memory category information.

17. A system comprising:
a plurality of computing nodes each comprising a processor and a memory, wherein the memories of the plurality of computing nodes form a shared memory,
a node controller comprising a controller memory, the node controller to:
receive a first request including an address of a first memory block of a plurality of memory blocks in the shared memory, wherein each respective memory block of the plurality of memory blocks is associated with a respective memory category of a plurality of memory categories, the plurality of memory categories comprising different cache coherency protocols for managing cache coherency for corresponding memory blocks;
determine whether a memory category associated with the first memory block is a first memory category or a second memory category, wherein the first memory category comprises a first cache coherency protocol that uses a coherency directory comprising state and ownership information stored in a first memory of a first computing node of the plurality of computing nodes, and the second memory category comprises a second cache coherency protocol that uses a coherency directory stored in the controller memory of the node controller but not in the first memory of the first computing node; and
in response to determining that the memory category associated with the first memory block is the second memory category, determine whether the coherency directory stored in the controller memory contains state and ownership information corresponding to the address included in the first request, and in response to determining that the coherency directory stored in the controller memory contains state and ownership information corresponding to the address, transmit, from the node controller, a response to the first request based on the state and ownership information corresponding to the address.

18. The system of claim 17, wherein the node controller is to:
in response to determining that the memory category associated with the first memory block is the first memory category, determine whether the coherency directory stored in the first memory of the first computing node contains state and ownership information corresponding to the address included in the first request, and transmit a response to the first request based on the state and ownership information corresponding to the address and contained in the coherency directory stored in the first memory of the first computing node.

19. The system of claim 17, wherein a second memory block of the plurality of memory blocks is associated with the first memory category, and the node controller is to:
- store, in the coherency directory stored in the first memory of the first computing node, state and ownership information for the second memory block; and
- store, in a coherency directory cache in the controller memory, a copy of the state and ownership information for the second memory block.

20. The system of claim 17, wherein the first request is originated from a requesting processor of the processors and transmitted to the node controller by a second another node controller associated with the requesting processor.

* * * * *